US009283976B2

(12) United States Patent
Wieth et al.

(10) Patent No.: US 9,283,976 B2
(45) Date of Patent: Mar. 15, 2016

(54) RESTRAINING BELT FOR CHILDREN IN A SHOPPING CART

(76) Inventors: Franz Wieth, Puchheim (DE); Horst Sonnendorfer, Puchheim (DE)

( * ) Notice: Subject to any disclaimer, the term of this patent is extended or adjusted under 35 U.S.C. 154(b) by 0 days.

(21) Appl. No.: 13/505,585

(22) PCT Filed: Oct. 27, 2010

(86) PCT No.: PCT/EP2010/066227
§ 371 (c)(1),
(2), (4) Date: Jun. 4, 2012

(87) PCT Pub. No.: WO2011/051318
PCT Pub. Date: May 5, 2011

(65) Prior Publication Data
US 2012/0234999 A1    Sep. 20, 2012

(30) Foreign Application Priority Data
Nov. 2, 2009   (DE) .................... 20 2009 014 783 U

(51) Int. Cl.
B60R 22/18    (2006.01)
B62B 3/14    (2006.01)
B62B 5/00    (2006.01)

(52) U.S. Cl.
CPC ............. B62B 3/1452 (2013.01); B62B 3/1444 (2013.01); B62B 3/142 (2013.01); B62B 3/144 (2013.01); B62B 5/0006 (2013.01)

(58) Field of Classification Search
CPC ..................... B62B 3/1452; B62B 3/1444
See application file for complete search history.

(56) References Cited

U.S. PATENT DOCUMENTS

| 3,306,661 | A | * | 2/1967 | Allen | 297/474 |
| 3,350,136 | A | | 10/1967 | Allen | |
| 4,868,544 | A | * | 9/1989 | Havens | 340/568.5 |
| 5,210,968 | A | * | 5/1993 | Rehrig | 40/308 |
| 5,280,932 | A | * | 1/1994 | Folsom | 280/33.992 |
| 5,289,936 | A | * | 3/1994 | Jones et al. | 220/4.28 |
| 5,306,033 | A | * | 4/1994 | Evans | 280/33.992 |
| 5,363,575 | A | * | 11/1994 | Sawyer et al. | 40/308 |
| 5,439,253 | A | * | 8/1995 | Trubiano | 280/801.1 |
| 5,794,953 | A | * | 8/1998 | Duchene et al. | 280/33.992 |
| 5,901,482 | A | * | 5/1999 | Sawyer | B62B 3/142 |
| | | | | | 280/33.992 |
| 5,918,891 | A | * | 7/1999 | Russell | 280/33.991 |
| 5,931,482 | A | | 8/1999 | Chirgwin | |
| 6,186,521 | B1 | * | 2/2001 | Divoky et al. | 280/33.993 |
| 6,390,552 | B1 | * | 5/2002 | Veron | 297/256.17 |
| 7,178,776 | B2 | * | 2/2007 | Buck | F16L 3/1008 |
| | | | | | 174/541 |
| 7,780,240 | B2 | * | 8/2010 | Sonnendorfer et al. | 297/474 |
| 7,971,838 | B2 | * | 7/2011 | Osborn | F16B 2/065 |
| | | | | | 248/228.1 |

(Continued)

FOREIGN PATENT DOCUMENTS

| DE | 10352095 A1 * | 6/2005 | B62B 5/08 |
| DE | 202005012535 U1 | 12/2006 | |
| FR | 2836446 A1 * | 8/2003 | B62B 3/14 |

*Primary Examiner* — Joshua J Michener
*Assistant Examiner* — Chiedu Chibogu
(74) *Attorney, Agent, or Firm* — Laurence A. Greenberg; Werner H. Stemer; Ralph E. Locher

(57) ABSTRACT

A restraining belt for children in a shopping cart is disposed in a housing. The housing is fastened on the shopping cart. A fastening element is provided by way of which a lattice bar of the shopping cart is enclosed in a U-shape. The fastening element has clip-like protrusions extending between the individual lattice bars and the clip-like protrusions have grooves and edges of the housing engage in the grooves.

5 Claims, 3 Drawing Sheets

(56) References Cited

U.S. PATENT DOCUMENTS 7,997,560 B2 * 8/2011 Bergdoll .................. 256/24
2004/0135330 A1 * 7/2004 Trubiano ................. 280/33.992
2007/0085282 A1 * 4/2007 Ryan ........................ 280/33.992
2008/0315663 A1   12/2008 Sonnendorfer et al.

* cited by examiner

RESTRAINING BELT FOR CHILDREN IN A SHOPPING CART

TECHNICAL FIELD

The invention relates to restraining belts for children in shopping carts.

PRIOR ART

A restraining belt of said type is known from German utility model DE 202005012535 U1, which corresponds to U.S. Patent Application Publication US 2008/0315663 A1, and which is herewith incorporated by reference.

Said restraining belt is situated in a flat housing. Said housing has integrally formed fastening elements which permit simple and fast snap-action fastening to the lattice bars of a shopping cart.

It has been found that the spacings between the lattice bars are not uniform depending on the model of shopping cart.

For the different shopping cart models, it is necessary to provide different housings with fastenings adapted in each case to the lattice spacings of the respective shopping cart model, which disadvantageously increases the variety of parts.

It has also been found that there is demand for two restraining belts in one shopping cart, and as a result of this an even greater number of different variants for the fastening must be provided, which increases the variety of parts yet further.

Furthermore, it has been found that the mechanical demands for the fastening of the housing must also be adapted to the situation arising from the fact that the housing for the belt is fastened to parts of the shopping cart which are repeatedly pivoted open and pivoted closed again.

The combination of these movable parts is referred to in technical terminology as a "baby flap". Said baby flap construction if integrated into the rear wall of the shopping cart, which if necessary provides a backrest and a seat region for the infant. All of the parts of the construction otherwise bear substantially flat against the rear wall of the basket.

The baby flap construction is composed of two flaps. One flap, which forms the backrest of the child seat, is rotatably mounted with its lower edge approximately in the lower third of the rear basket wall, and projects with its top edge slightly beyond the level of the handle bar. Said flap is referred to as the backrest flap.

The other flap forms the seat element. Said flap is rotatably mounted approximately in the centre of the rear side wall, and is referred to as the seat surface flap.

If necessary, when the child seat is required, the backrest flap is pivoted about its mounting and forms an angle of approximately 20 degrees with the rear wall of the shopping cart.

The housing of the restraining belt is situated on that side of the backrest flap which faces toward the handle bar. The housing is mounted slightly below the upper edge of the backrest flap and bears directly against the lattice bars.

As the backrest flap is pivoted, the seat surface flap moves out of a position in which it is substantially parallel to the backrest flap into a position in which the seat surface flap and the backrest flap are at an angle of approximately 90 degrees with respect to one another.

In the rear wall of the shopping basket there are situated two openings for the legs of an infant seated in the child seat. The lower edges of said openings are situated at the level of the seat surface flap.

In the case of some shopping cart models, a further flap is provided. Said flap is referred to as a closure flap and makes it possible to close off the leg openings provided in the rear wall. In this way, in the shopping cart, a stowage compartment is formed which is separate from the rest of the basket volume.

There are two possibilities for the position of the seat surface flap in the initial position. In one possibility, the seat surface flap is pivoted downward with respect to the mounting on the rear wall, and in the other position the seat surface flap is pivoted upward with respect to the mounting on the rear wall and, during the movement of the backrest flap, travels along the bars of the backrest flap.

If the child seat is not required, the backrest flap is pivoted again into the position in which it lies parallel to the rear wall of the basket.

It has been found that, during the pivoting of the backrest flap and the movements, thereby triggered, of the seat surface flap and closure flap, said parts come into contact with the housing for the restraining belt.

Even though the housing for the restraining belt is already of very flat design, this leads, in rare cases, to jamming of the parts.

DISCLOSURE OF THE INVENTION

Technical Object

It is an object of the invention to provide a restraining belt for children which has a universal fastening facility for the different lattice bar diameters and lattice bar spacings of the different shopping cart models and which permits simple and secure fastening of a housing for one or two restraining belts.

It is a further object of the invention to design the fastening for the housing of the restraining belt such that, during the movement of the baby flap construction, the seat surface flap or the closure flap is deflected away from the housing of the restraining belt in order to prevent jamming of the parts.

Technical Solution

Said objects are achieved by means of a fastening element which engages in a U shape around in each case one lattice bar, and in addition has bracket-like projections which extend through between the individual lattice bars. Said bracket-like projections have grooves into which the edges of the housing for the restraining belt engage. The housing is hereby connected in a positively locking manner to the lattice bars of the backrest flap.

In one refinement, the fastening element is designed such that a contact surface for the housing of the restraining belt is provided in the intermediate space between the individual lattice bars. Said contact surface runs flush with the lattice bars as whereby the housing of the restraining belt can be fastened as closely as possible to the backrest flap.

The fastening element.

The bracket-like projections of the fastening element are formed as oblique run-on surfaces and hereby deflect the seat surface flap or the closure flap away from the housing of the restraining belt.

In one refinement, a clamping connection is provided which is integrated in the fastening element and which permits a non-positively locking connection between the lattice bar and the fastening element.

Advantageous Effects

The present invention advantageously permits, with few parts, a universal fastening of the housing to the different shopping cart models.

The shaping of the fastening element with oblique run-on surfaces prevents jamming of parts when the baby flap is pivoted closed.

BRIEF DESCRIPTION OF THE DRAWINGS

The invention will be described below on the basis of four figures.

In detail, in the figures.

DESCRIPTION OF THE INVENTION

Figure 1:
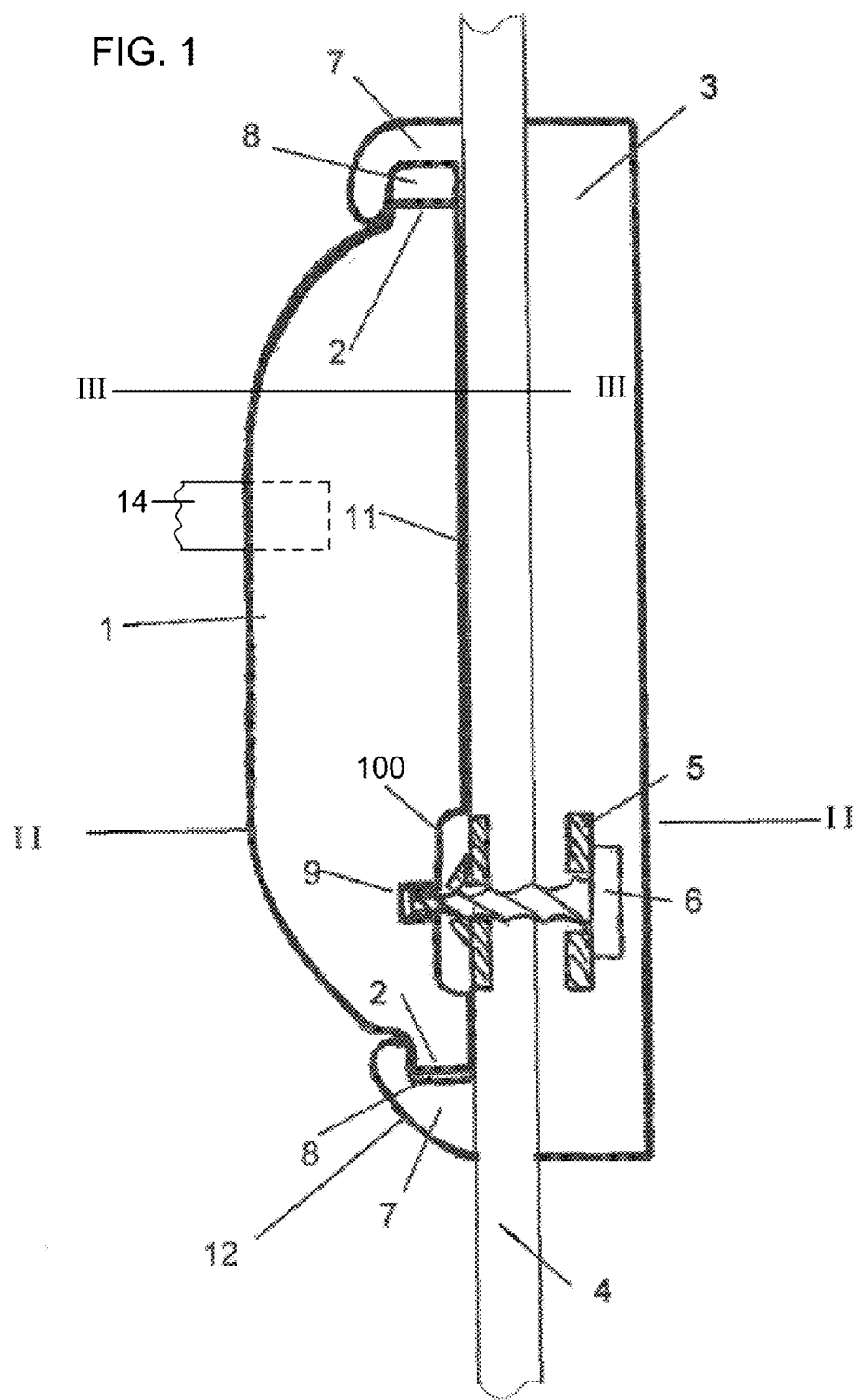
FIG. 1 shows, in a sectional illustration, the housing for the restraining belt, the fastening element and a lattice bar of the shopping cart as viewed from the side.

The housing 1 is of substantially flat design with curved edges which taper toward webs 2 at the upper and lower edges of the housing.

The fastening element 3 encompasses the lattice bar 4. The encompassment is shown in detail in FIG. 2. A non-positively locking connection between the fastening element 3 and lattice bar 4 is generated by a clamp 5 which engages around the lattice bar 4 and whose clamping action is effected by the screw 6. Before the screw 6 has been tightened, a certain non-positively locking connection is generated by the clamp 5 alone, said connection being sufficient to hold the fastening element 3 on the lattice bar 4 but still permit a displacement of the fastening element 3 along the lattice bar 4.

The bracket-like projections 7 of the fastening element 3 project through the lattice bars and have grooves 8. The bars 2 of the housing 1 engage into said grooves 8.

It can be clearly seen in the selected illustration that the housing 1 bears flat against the lattice bar 4, and the fastening element positioned on the opposite side of the lattice bar does not require any space on that side of the lattice bar against which the housing 1 bears.

The spacing between the inner side of the groove 8 and the lattice bar 4 is coordinated with the width of the webs 2 such that the housing 1 bears directly against the lattice bar 4. The bracket-like projections 7 may also be of elastic form, as a result of which the housing 1 always bears under preload against the lattice bar.

The screw 6 extends through the clamp 5 and into a channel 9 of the housing 1.

Said channel 9 runs over the entire longitudinal side of the housing 1 in a depression 10. The width and depth of the channel 9 is coordinated with the dimensions of the screw 6.

When the screw 6 is tightened—which is carried out after the fastening element 3 has been moved along the lattice bar 4 into its final position and after the edges 2 of the housing 1 have been inserted into the grooves 8—the screw 6 penetrates into the channel 9 and a thread is cut into the walls of the channel 9.

The tightening of the screw 6 therefore generates a positively locking connection between the screw 6 and the housing 1 in addition to the increased non-positively locking connection between the lattice bar 4 and the fastening element 3.

The illustration in FIG. 1 shows only one fastening element 3, but at least two fastening elements 3 are provided for the fastening of the housing 1 to the shopping cart; in the case of a housing for two restraining belts, which is correspondingly longer, more fastening elements 3 may also be used in the described way.

Since the channel 9 and the webs 2 run across the entire housing, it is easily possible for the housing 1 to be positioned symmetrically in the shopping cart. It is particularly advantageous here that the housing 1 can be mounted symmetrically even when the fastening elements, which are restricted by the positions of the lattice bars, cannot themselves be mounted symmetrically.

The rear side of the housing 1 bears tangentially against the lattice bars and flat against a contact surface 10 provided by the fastening elements.

The lower bracket-like projection 7 has an oblique run-on surface 12 which, when the child seat is pivoted closed, deflects a movable part such that the movable part cannot become jammed with the housing 1. Such a movable part may be the seat surface of the child seat or some other flap of the baby flap construction.

Figure 2:
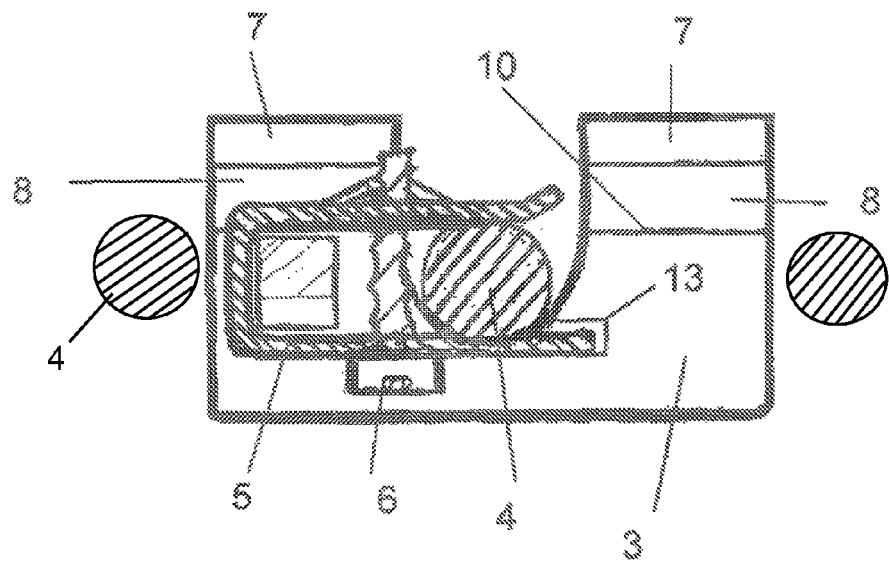
FIG. 2 shows, in a sectional illustration, the fastening element and a lattice bar as viewed from above.
Figure 3:
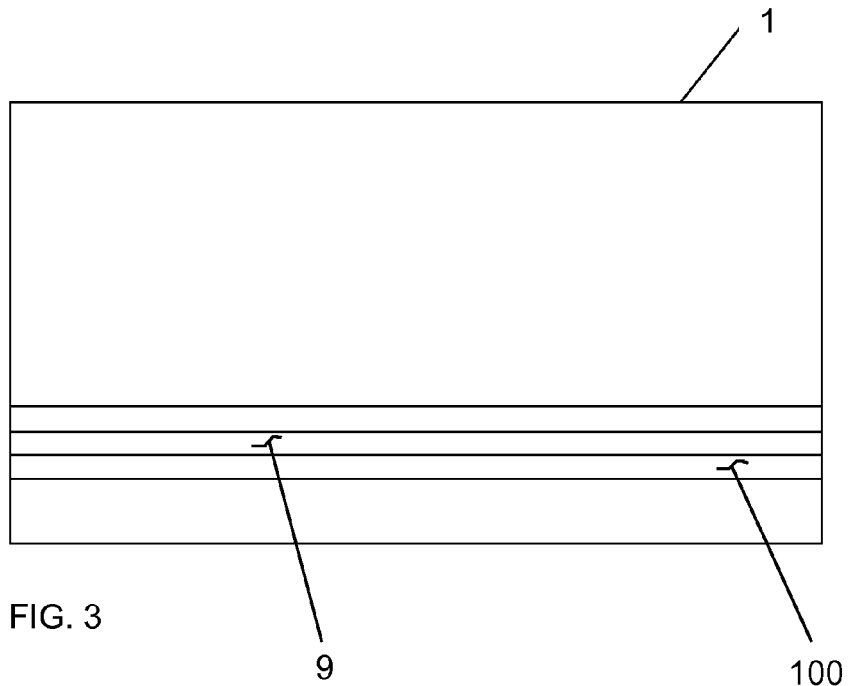
FIG. 3 is a rear view of the housing for the restraining belt.
Figure 4:
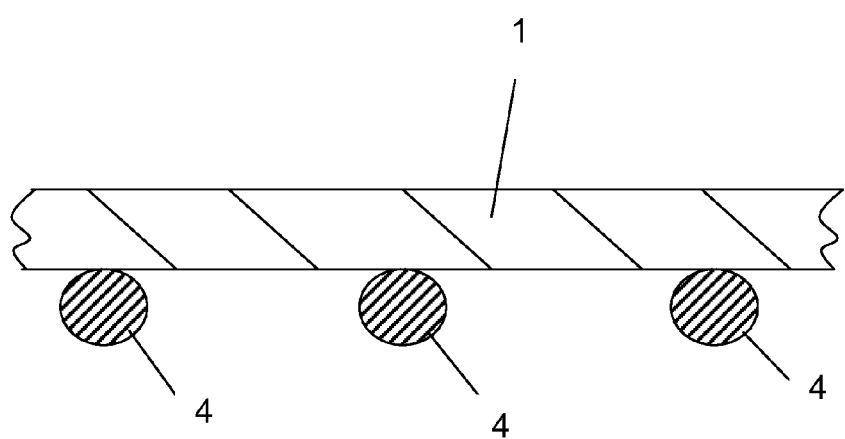
FIG. 4 is a section view taken at III-III of FIG. 1 which shows a portion of the housing bearing against the lattice bars.

FIG. 2 shows a section along the line II-II in FIG. 1 in a view from above, but for clarity, the housing 1 has been omitted.

The fastening element 3 engages in a U shape around the lattice bar 4. The lattice bar 4 bears with one side against the fastening element 3, and the shape of the fastening element 3 is coordinated with the thickness of the lattice bar 4 such that the contact surfaces 10 run tangentially with respect to the radius of the lattice bar 4. Corresponding fastening elements 3 are provided in accordance with the thickness of the lattice bar 4.

The lattice bars 4 of the shopping cart have, in most cases, a diameter of 3.5 mm or 4.5 mm. It is therefore possible, with only two different fastening elements 3, for the housing 1 for the restraining belt 14 to be mounted on a multiplicity of different models of shopping carts.

The bracket-like projections 7 have a groove 8. During the mounting of the fastening element 3 on the lattice bar 4, the fastening element 3 is firstly placed around the lattice bar 4, and the clamp 5 is subsequently inserted laterally into a slot 13 of the fastening element 3. The clamp 5 then bears against two opposite sides of the lattice bar 4. Before the screw 6 is tightened, a non-positively locking connection is thus formed which duly holds the fastening part 3 on the lattice bar 4 but nevertheless permits easy positioning.

The invention may be used both for the fastening of housings for restraining belts in which one restraining belt is situated in the housing and also for the fastening of housings in which two restraining belts are situated.

The invention is industrially applicable for the fastening of housings for restraining belts to a shopping cart and also for the fastening of other elements, such as advertising panels, to the lattice bars of a shopping cart.

The invention claimed is:

1. A restraining assembly for children on a shopping cart, the restraining assembly comprising:
   a housing having a restraining belt;
   a fastening element having projections projecting through between individual lattice bars of the shopping cart in a mounted position of said fastening element on the shopping cart, said fastening element configured to engage in a U-shape around an individual lattice bar of the individual lattice bars of the shopping cart; and
   wherein said projections have grooves formed therein to receive edges of said housing that are engaged in said grooves;
   a clamp having a substantially U-shape defining a base and two legs, said clamp configured for engaging around the individual lattice bar disposed between said projections for holding said fastening element on the individual lattice bar, said clamp extending between said projections; and a screw passing through said legs of said clamp and into said housing, tightening said screw clamps said legs against the individual lattice bar disposed between said legs, said legs of said clamp extending in a direction substantially perpendicular to said projections.

2. The restraining assembly according to claim 1, wherein the housing for the restraining belt bears directly against the individual lattice bars.

3. The restraining assembly according to claim 1, wherein the projections are elastic brackets.

4. The restraining assembly according to claim 1, wherein said projections of said fastening element are formed with an oblique run-on surface.

5. The restraining assembly according to claim 1, wherein said housing has channel extending over an entire length thereof, said channel for receiving and threading said screw to said housing.

\* \* \* \* \*